T. V. Waymoth. Sheet 1. 3 Sheets.

Envelope Mach.

No. 2,366. Reissued Sept. 25, 1866.

Witnesses.

J. W. B. Langston

Wm. Treuen

Inventor.

Thos. V. Waymoth

Per Munn & Co

Attorneys

T. V. Waymoth. Sheet 2, 3 Sheets.

Envelope Mach.

No. 2,366. Reissued Sept. 25, 1866.

Witnesses.

J. H. B. Ringston

Wm. Treurn

Inventor.

Thos. V. Waymoth

Per Munn & Co

Attorneys

Sheet 3, 3 Sheets.

T. V. Waymouth.
Envelope Mach.

No. 2,366. Reissued Sept. 25, 1866

Witnesses.

J. W. B. Codington

Wm. Trewin

Inventor.

Thos. V. Waymouth

Per Munn & Co

Attorneys

UNITED STATES PATENT OFFICE

HENRY C. BERLIN AND GEORGE H. JONES, OF NEW YORK, N. Y., ASSIGNEES OF THOMAS V. WAYMOTH.

MACHINE FOR GUMMING AND PRINTING ENVELOPES.

Specification forming part of Letters Patent No. 55,562, dated June 12, 1866; Reissue No. 2,366, dated September 25, 1866.

*To all whom it may concern:*

Be it known that THOMAS V. WAYMOTH, of the city, county, and State of New York, has invented a new and Improved Machine for Gumming and Printing Envelopes, &c.; and we do hereby declare that the following is a full, clear, and exact description thereof, which will enable others skilled in the art to make and use the same, reference being had to the accompanying drawings, forming a part of this specification, in which—

Figures 1, 4, 5, 6:
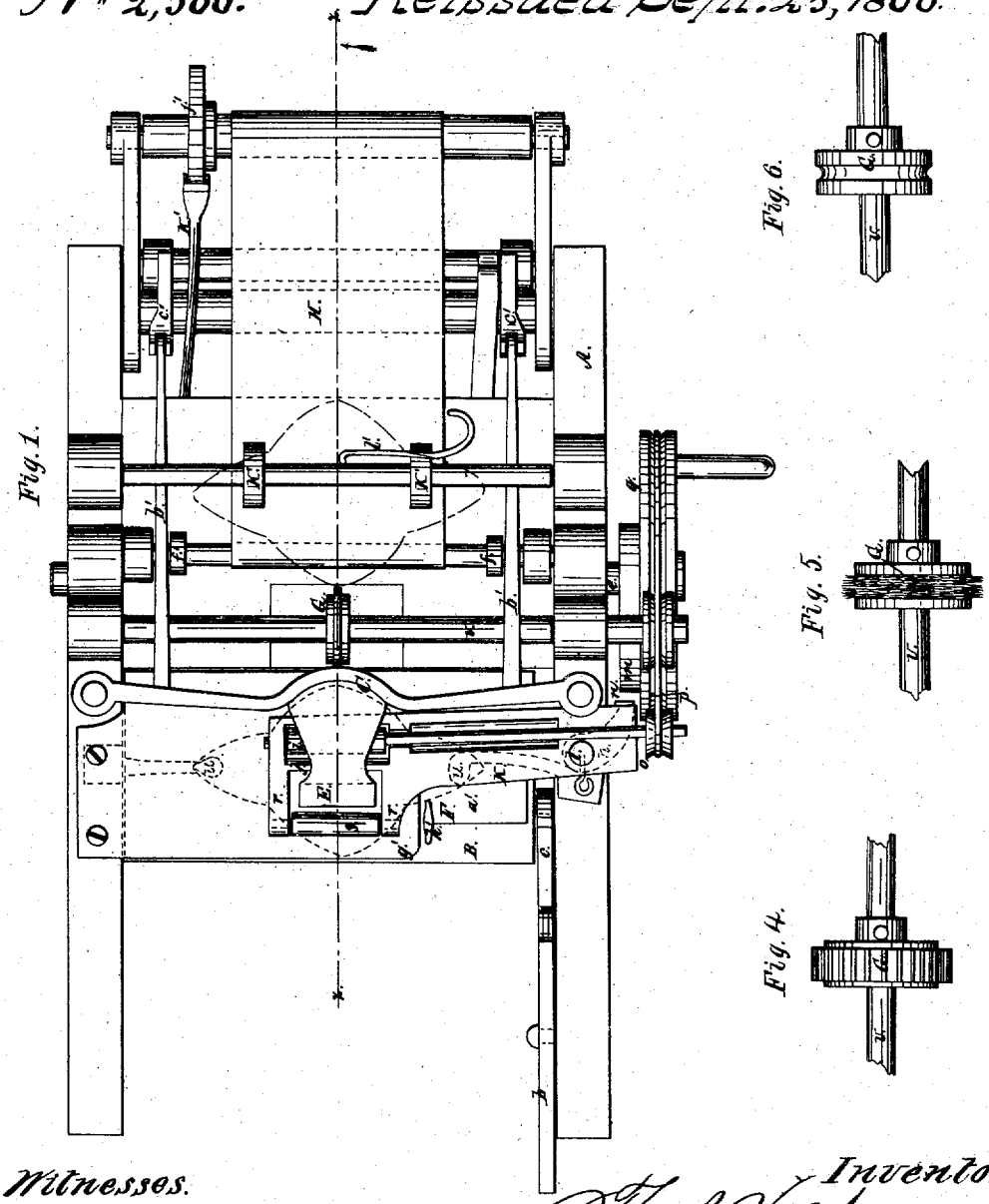
Figure 2:
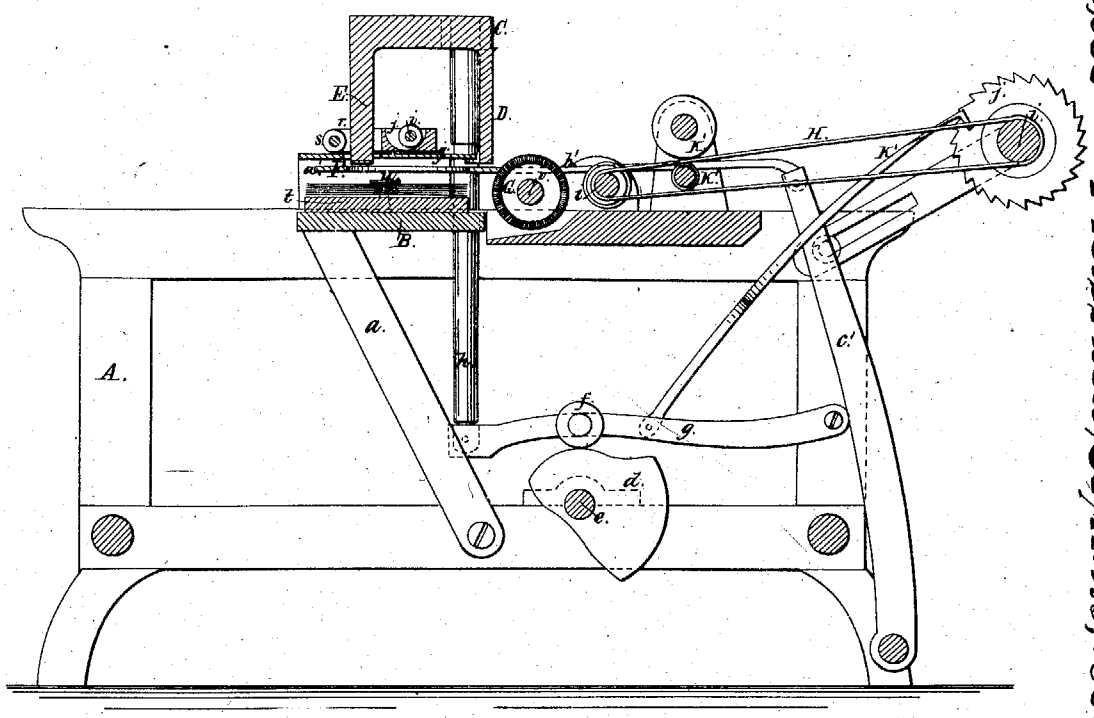
Figure 3:
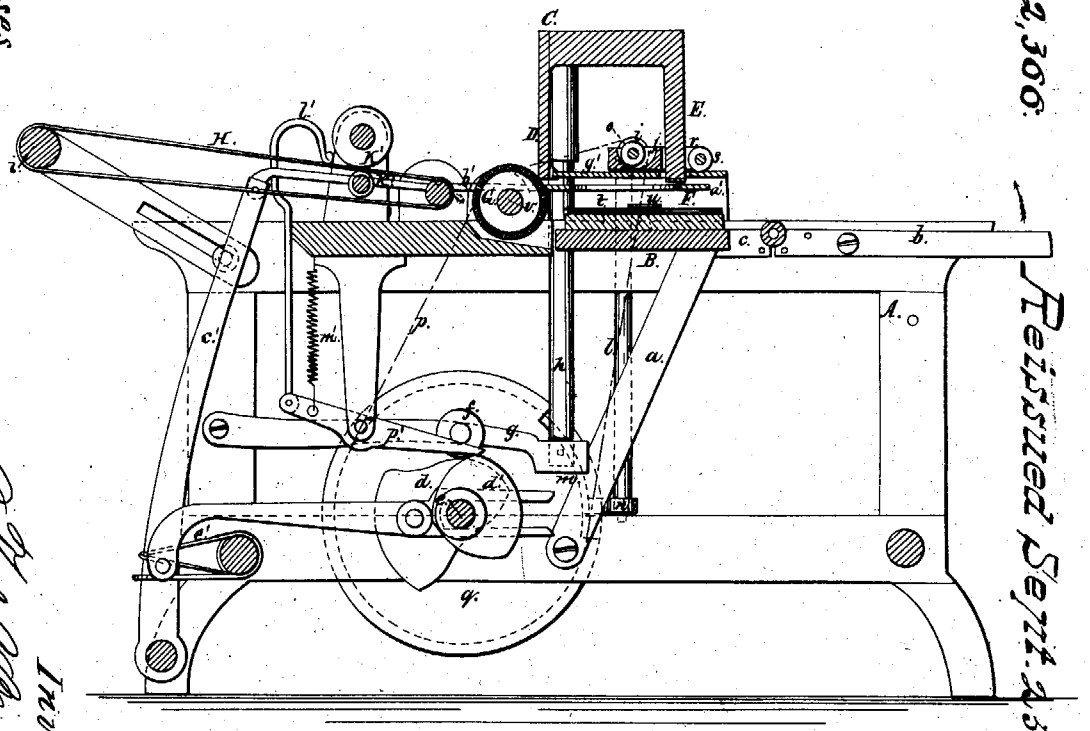

Figure 1 represents a plan or top view of this invention. Fig. 2 is a longitudinal vertical section of the same, taken in the plane indicated by the line X X, Fig. 1, and looking in the direction of the arrow opposite to that line. Fig. 3 is a similar section in the same plane, but looking in the direction opposite the arrow marked near the line X X in Fig. 1. Figs. 4, 5, and 6 are detached views of various modifications of my movable friction-separator.

Similar letters of reference indicate like parts.

This invention relates to a machine for gumming and printing the blanks for envelopes, wrappers, and other similar articles.

A represents a frame made of iron or any other suitable material of sufficient strength to form the bearings for the various working parts of my machine. The blanks to be gummed and printed are supported by a table, B, which rests on two arms or legs, *a*, that are hinged to the frame A, so that the table can be raised up to a horizontal position, as shown in Figs. 2 and 3; or that it can be turned back to an inclined position. Said table is operated by a lever, *b*, which is pivoted to the frame A, and the inner end of which connects, by a link, C, with the table.

If the lever and link are in line, as shown in Fig. 2, they form a brace, which retains the table in its horizontal position; but by turning the lever up in the direction of the arrow marked opposite to it in Fig. 3, the table is made to swing back.

Above the table B rises the yoke *c*, to which a rising and falling motion is imparted by the action of cams *d* in the driving-shaft *e*, said cams being arranged so that they act on roller-studs *f* secured to lever *g*, which are pivoted at one end to the frame A, whereas their other ends connect with the guide-rods *h* of the yoke *c*. This yoke carries the picker or gummer D, and also the type-case E, or, if desired, the type-case may be connected to a separate yoke.

The face of the gummer is supplied with gum by means of a roller, *i*, the axle of which has its bearings in the ends of the gum-box *j*, and this box is secured to an arm, *k*, which is keyed to a vertical arbor, V, to which an oscillating motion is imparted by means of a cam, *m*, acting on a tappet, *n*, as shown in Fig. 3.

By the oscillating motion of the arbor V the rollers *i* are made to sweep across the face of the gummer whenever said gummer reaches its highest position; and in order to enable the roller to transfer the requisite supply of gum to the gummer a revolving motion is imparted to it by extending its axle beyond the arm *k*, so as to obtain room for a small pulley, *o*. A belt, *p*, stretched over said pulley, and over a pulley, *q*, on the driving-shaft, transmits the desired motion from this last-named shaft to the gum-roller *i*; and this belt may be made of india-rubber or other elastic material, which will act as a spring to carry the arm *k* and gum-box *j* back to their original position as soon as the cam *m* ceases to act on the tappet *n*, or, if desired, a suitable tightening-roller may be applied to the belt *p*, so that the same will be enabled to accommodate itself to the varying position of the pulley *o* on the axle of the gum-roller *i*.

The arm *k* is provided with two lugs or projections, *r*, which form the bearing for the ink-roller *s*, which is intended to transfer the requisite quantity of printing-ink to the types in the type-case E. This roller receives its supply of ink from a suitable ink-well, which is not shown in the drawings.

In order to facilitate the operation of transferring the gum from the gummer to the blanks, and particularly to facilitate the operation of printing, an elastic bed, *t*, made of thick india-rubber cloth or other suitable material, is placed on the table B, under the pile of blanks, and this bed may be cut out to correspond to the shape of the blanks, or it may be made in any other desirable form or shape. By the action of the gummer one blank after the other is lifted off from the pile, and delivered to the reciprocating carrier F. The separation of each blank from the pile is facilitated by weak springs *u*, which bear down on the ends of said blanks, causing them to bend as the pickers raise them up, and a perfect separation of the blanks one from the other is insured by a movable separator, G. This separator consists of a brush or ratchet-wheel mounted on a shaft, *v*, to which a rapid revolving motion is imparted by the belt *p*, which also serves to impart motion to the gum-roller *i*, or instead of a brush or ratchet-wheel an endless apron or belt may be employed, which would be stretched over suitable pulleys, and which might be armed with suitable teeth or wings. Said separator moves in close proximity to the edges of the blanks, so that by its action and by the action of the current of air created by its motion, the blanks are effectually separated one from the other, and only one blank at a time is lifted from the pile and delivered to the carrier.

The carrier F consists of a platform, *a'*, which is supported by two arms, *b*, extending from upright levers *c*, to which an oscillating motion is imparted by the combined action of cams *d* and a spring, *e*. The arms *b* are supported and guided by grooved roller *f*, and their motion is so timed that the carrier F is made to pass under the gummer as soon as the latter has been raised enough to admit the same. At that point the gummer stops, retaining the blank raised by it, so that the carrier can pass between the same and the pile of blanks on the table B, and after the carrier has reached its extreme position it stops for a short time while the gummer reassumes its ascent, thereby bringing the blank in contact with the guard *g*, and causing it to disengage itself, and to drop down on the carrier. Said carrier is provided with two hooks, *h'*, which catch over the edge of the blank, and prevent its slipping off from the carrier. Immediately after the blank has been deposited on it the carrier moves back from under the gummer, and deposits the blank on the endless apron H. This apron is stretched over two rollers, *i'*, which have their bearings in suitable boxes or standards secured to the frame A, and on one of these rollers is mounted a ratchet-wheel, *j'*, and a pawl, *k'*, which engages with the teeth of said ratchet-wheel, and imparts to it and to the endless apron an intermittent motion. Said pawl is pivoted to one of the levers *g*, which connect with the guide-rods of the yoke *c*, and to which an oscillating motion is imparted by the action of the cam *d*, (see Fig. 2) or the requisite motion may be imparted to it in any other suitable manner.

As the carrier arrives at the back ends of its stroke over the inner end of the endless apron the edge of the blank resting on the same is caught between two pairs of pressing-rollers, K', situated above and below the apron in such a position that the same are compelled to revolve by the action of the apron, and that they compel the blank to move along with said apron without fail. After the motion of the apron has been completed a finger, *c*, descends and presses upon the blank just delivered, so as to prevent it from being disturbed in its position by the next succeeding stroke of the carrier. A rising and falling motion is imparted to said finger by the combined action of a spring, *m*, and cam *d*, which act in a double-armed lever, *p'*, to one end of which the finger is connected, as shown in Fig. 3.

The motion of the apron H is so regulated that the same travels a distance equal to the width of the gummed space on the blanks after the delivery of each blank, and by these means the gummed surface of one blank will not be covered by or permitted to come in contact with the succeeding blank, thus preventing said blanks from sticking together, and giving ample time to the gummed surfaces to dry.

From the foregoing description it is apparent that the nature of this invention consists in, first, the operation of the hinged table in combination with the gummer; second, the operation of the movable separator G, in combination with the gummer; third, imparting an intermittent motion to a suitable mechanism combined with the endless apron H and the reciprocating carrier F and gummer D; fourth, the operation of the finger *l'* and rollers K, in combination with the apron H and carrier F; fifth, putting on the gum on the seal-flap of an envelope-blank by the picker or gummer, so that the envelope is being raised or held stationary while the balance of the pile is removed.

By this machine the seal-flaps of the blanks for envelopes can be gummed in a simple, quick, and effective manner, and, simultaneously with the operation of applying the gum, any desired words or characters can be printed on the blanks.

The same machine may also be used with advantage for gumming and printing the blanks of newspaper-wrappers, or of any other similar article.

What we claim as the invention of THOMAS V. WAYMOTH, and desire to secure by Letters Patent of the United States, is—

1. The operation of the hinged table B, in combination with the gummer D, substantially in the manner and for the purpose described.

2. The operation of the movable separator G, in combination with the gummer D, substantially in the manner and for the purpose described.

3. Imparting an intermittent motion to a suitable mechanism combined with the endless apron H and the reciprocating carrier F and gummer D, operating in the manner and for the purpose described.

4. The operation of the finger $l'$ and rollers K′, in combination with the apron H and carrier F, substantially in the manner and for the purpose described.

5. Putting on the gum on the seal-flap of an envelope-blank by the picker or gummer, so that the envelope is raised or held stationary while the balance of the pile is removed, substantially in the manner and for the purpose described.

H. C. BERLIN.
GEO. H. JONES.

Witnesses:
HENRY WEHL,
GUSTAV ZIMMERMANN.